W. FELS.
POWER TRANSMISSION MECHANISM.
APPLICATION FILED MAY 16, 1918.
1,435,596.
Patented Nov. 14, 1922.
4 SHEETS—SHEET 1.
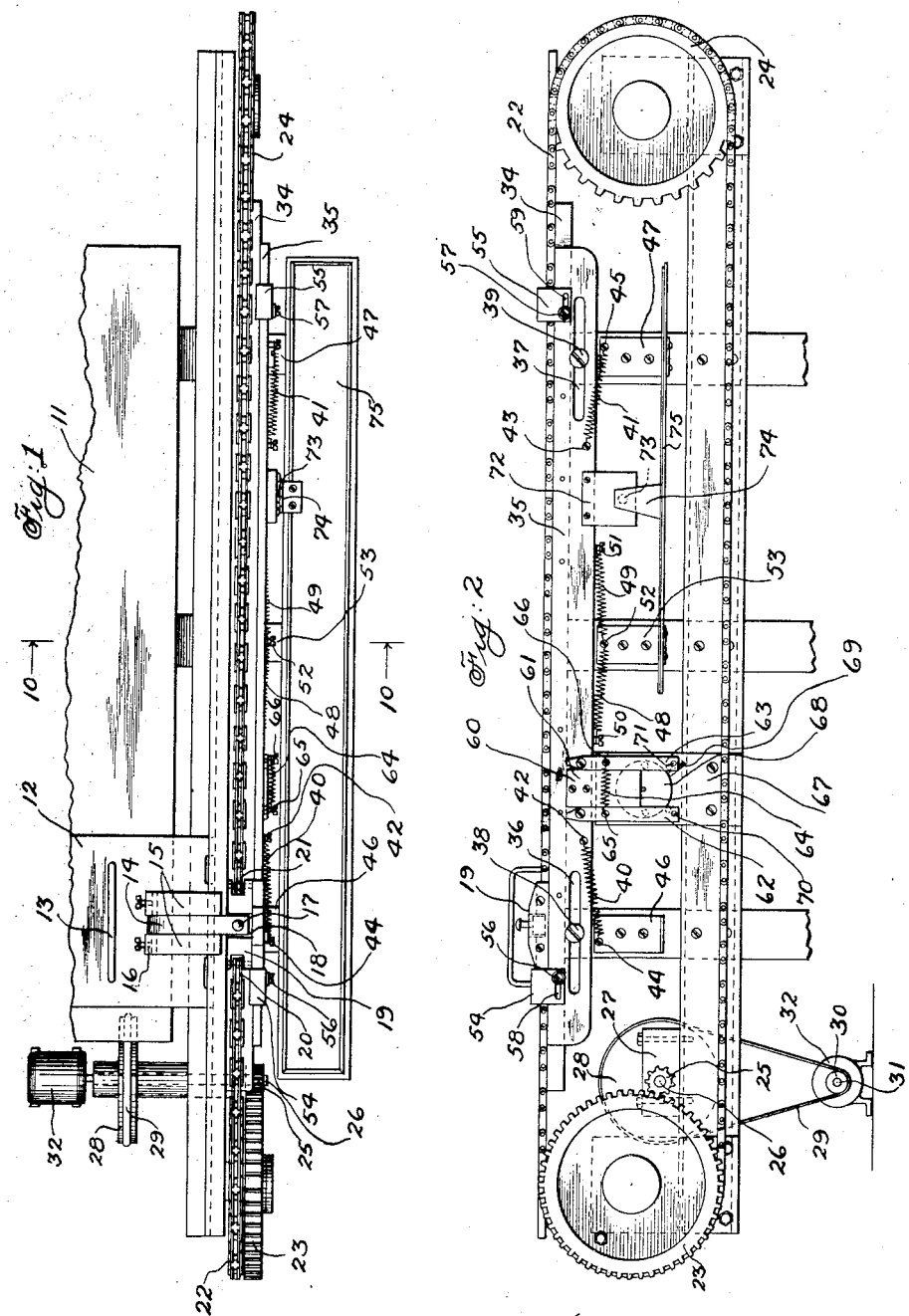
William Fels Inventor
By his Attorneys
Emery, Booth, Janney & Varney

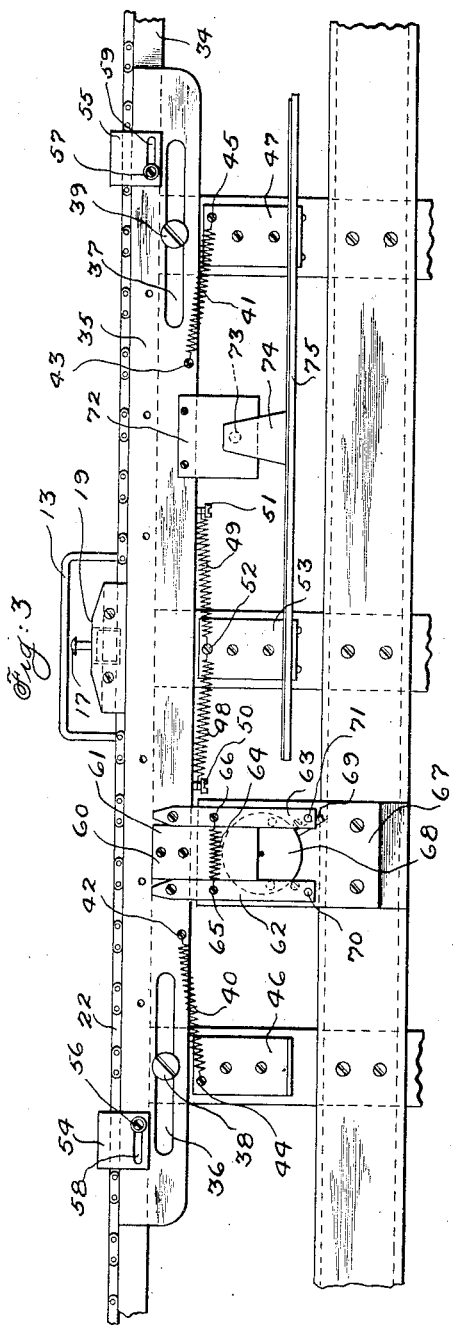

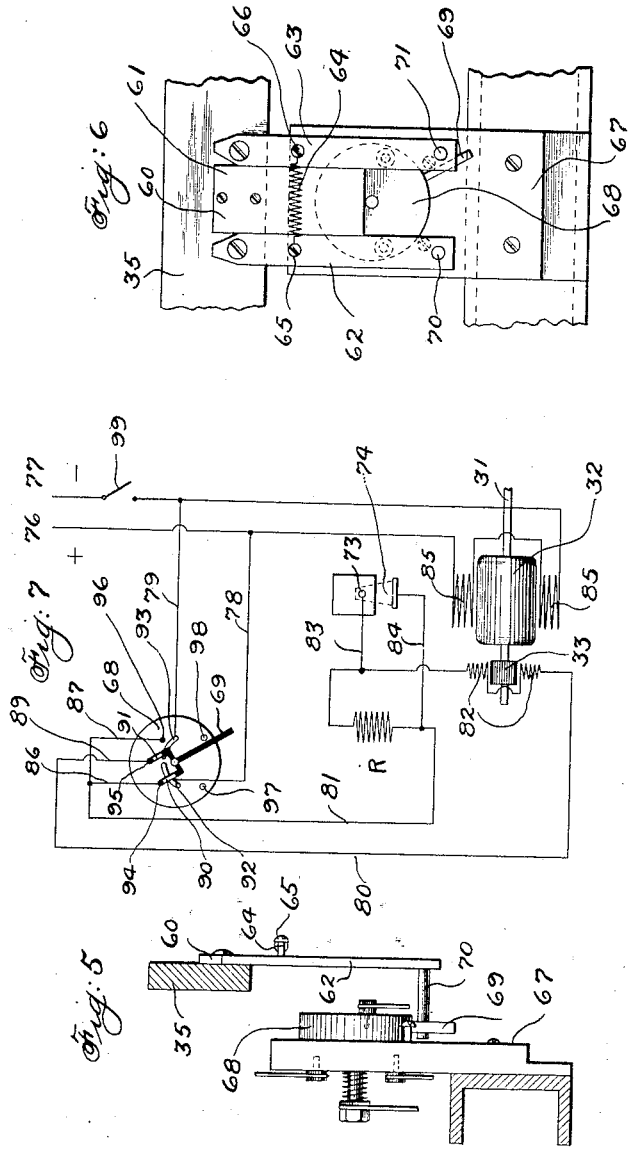

W. FELS.
POWER TRANSMISSION MECHANISM.
APPLICATION FILED MAY 16, 1918.
1,435,596.
Patented Nov. 14, 1922.
4 SHEETS—SHEET 4.
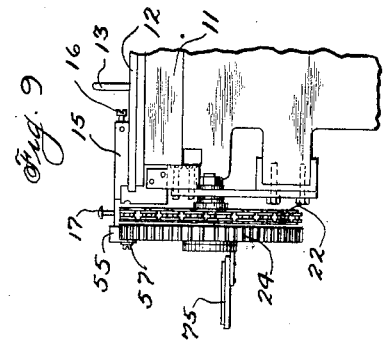
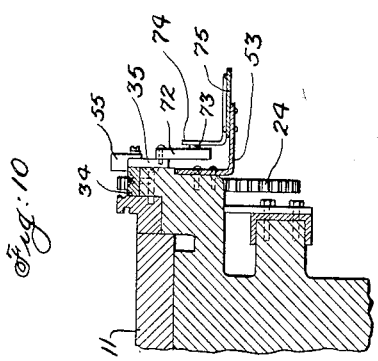
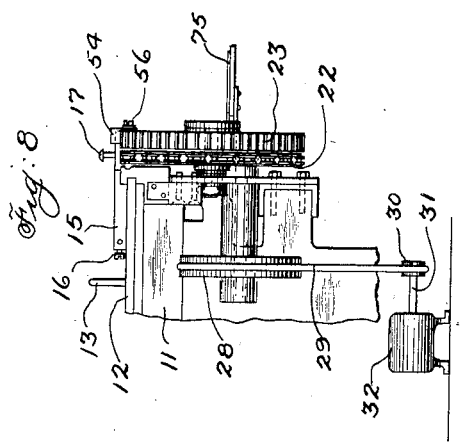
William Fels, Inventor
By his Attorneys
Emery, Booth, Janney & Varney Patented Nov. 14, 1922.

1,435,596

UNITED STATES PATENT OFFICE.

WILLIAM FELS, OF ELIZABETH, NEW JERSEY, ASSIGNOR TO MAX NYDEGGER, OF ELIZABETH, NEW JERSEY.

POWER-TRANSMISSION MECHANISM.

Application filed May 16, 1918. Serial No. 234,891.

*To all whom it may concern:*

Be it known that I, WILLIAM FELS, a subject of the Emperor of Austria, residing in Elizabeth, county of Union, State of New Jersey, have invented an Improvement in Power-Transmission Mechanism, of which the following is a specification.

My invention relates to power-transmission mechanism, and more particularly to such mechanism as is adapted to impart reciprocatory motion to a part or parts of a machine to which my invention may be applied.

The object of the present invention is to provide mechanism of the general character indicated which shall be applicable to a wide variety of machines intended for different purposes, which mechanism shall be simple and compact in construction, and efficient and convenient in use.

By way of example, I have illustrated in the accompanying drawings a preferred embodiment of the power-transmission mechanism of my invention as applied to the reciprocating carriage of what is normally a hand-operated knitting machine, but which is converted by the power-transmission mechanism of my invention into an automatically operated knitting machine. It is however to be understood that my invention may be applied to various kinds of machines, though particularly adapted to be used in the connection shown.

Referring to the drawings—

Fig. 1 is a plan view of such embodiment;

Fig. 2 is a side elevation of the same;

Fig. 3 is an enlarged detail view of a portion of the reversing mechanism at one stage of its operation;

Fig. 4 is a similar view showing the reversing mechanism at another stage of its operation;

Figs. 5 and 6 are side elevational and plan views, respectively, of the current reversing mechanism;

Fig. 7 is a diagrammatic view of the electric circuits;

Figs. 8 and 9 are detail views in end elevation of the two ends of the embodiment herein illustrated by way of example;

Fig. 10 is a detail cross-sectional view taken along the line 10—10 of Fig. 1.

Referring to the drawings, 11 indicates a machine of any desired type having a reciprocatable member such as a hand operated knitting machine having a reciprocatable member or carriage 12 normally adapted to be hand-operated by means of a handle 13.

To convert such a machine into an automatic device, I provide reciprocating mechanism attachable to the frame of the machine and means for releasably connecting the carriage 12 to said mechanism, said means including a pivoted connection or latch 14. At either side of said latch and secured to the reciprocatable member 12, I provide raised portions 15 between which the latch 14 is pivotally supported, as at 16. The connection member or latch 14 may be provided with a projection or knob 17 for facilitating manipulation of the same.

Connection may be effected between the reciprocatable portion 12 of machine 11 and the power-transmission mechanism in any suitable manner. For this purpose, the free end of latch 14 may fit into and engage a slot or depression 18 in a member 19 to which the ends 20 and 21 of a sprocket chain 22 may be connected in any suitable manner. It will therefore be noted that movement, reciprocatory or otherwise, imparted to sprocket chain 22 will move member 19, and thereby latch 14 and its associated reciprocatable carriage or other member 12.

For the purpose of imparting the desired motion to member 12, sprocket chain 22 engages a plurality of sprocket wheels 23, 24, one of said sprocket wheels as 23 being meshed with a pinion 25 mounted at one end of a shaft 26 rotatably mounted in any suitable portion 27 of the frame of the machine 11. Said shaft carries at its other end a pulley 28 which is engaged by a belt 29 which in turn engages a pulley 30 at one end of a shaft 31 of a motor 32, at the other end of which is an armature 33.

It is of course to be understood that any equivalent of the mechanical means herein described may be employed without departing from the spirit of the present invention.

Suitably mounted on the frame of the machine 11, as by being supported adjacent a bar 34 over the top of which the sprocket chain 22 rides, is a reversing bar or member 35. This member may comprise, as in the illustrative embodiment herein shown and described, an elongated member provided with a plurality of elongated slots 36, 37. Said member 35 is reciprocatably supported by being mounted on bolts or other members 38 and 39 passing through the respective slots 36 and 37 and having enlarged heads to prevent accidental transverse displacement of member 35 away from its support.

Member 35 is normally held in an intermediate or neutral position by means of springs 40 and 41, one end of each spring being attached to member 35, as at 42 and 43, respectively, and the other end of each spring being attached as at 44 and 45, respectively, to any suitable portions of the frame of the machine, as at 46 and 47, respectively. I may also provide in addition to springs 40 and 41, a plurality of springs 48 and 49 attached at 50 and 51, respectively, to member 35 and at their other ends to a part 52 on any suitable portion of the machine frame, as member 53. It is of course to be understood that the number of springs may be varied, and that a single spring may be used for normally maintaining member 35 in its intermediate or neutral position and for restoring it to such neutral position when displaced therefrom to either side of the neutral point.

Mounted on member 35 so as to be engageable with any of the moving, as reciprocating, portions of the device, as carriage 12, or connection member 14, or member 19, as the case may be, are a plurality of stops or projections 54, 55. These stops are intended to be engaged by any one or more of the moving parts of the device, herein shown as part 19, adjacent each end of the travel of carriage member 12.

Preferably members 54 and 55 are adjustable along the whole length of member 35, since I am in this way enabled to regulate the length of travel of member 12. For this purpose members 54 and 55 (see especially Fig. 10 of the drawing) have tongue and groove or other suitable engagement with member 35 along the upper and outer edges or faces of the same. In order to maintain members 54 and 55 in adjusted position on member 35, I provide the set screws 56 and 57 passing through the respective apertures 58 and 59 in the respective members 54 and 55 for binding engagement with member 35.

While purely mechanical means may be employed for periodically reversing the direction of propulsion of the actuating means to thereby periodically reverse the direction of travel of carriage member 12, I prefer to employ the electrical means illustrated as possessing obvious advantages of compactness, and certainty and ease of operation. For this purpose member 35 is provided with switch reversing mechanism 60 carried by said member.

Such switch reversing mechanism may comprise a stationary member 61 at the sides of which are supported members 62 and 63 which are drawn towards each other and against the sides of member 61 by means of a spring 64 attached, as at 65 and 66, to respective members 62 and 63. Supported on a suitable portion of the machine frame, as on member 67, is a reversing switch 68 provided with a projecting, operating member 69 adapted to be successively engaged by the projections or pins 70 and 71 on the respective members 62 and 63. Attached to member 35 is a member 72 carrying a contact 73 adapted normally to be in electrical connection with a contact 74 supported on any suitable portion of the frame of the machine, as on a ledge or platform 75.

The electrical connections are clearly shown in Fig. 7. Suitable current, herein shown as direct current, is drawn off from any suitable source of supply through lead wires 76 and 77. Lead wires 76 and 77 are provided with shunt connections 78 and 79, respectively, leading through reversing switch 68 to the connector wires 80 and 81 and thence to the armature windings 82. In connector wire 81 there is interposed a resistance R normally short-circuited by means of contacts 73 and 74 which are shunted about resistance R by means of connector wires 83 and 84. The main lead wires 76 and 77 lead to the field windings 85 of motor 32.

The reversing switch 68 may have the connections shown, comprising the two branch connections 86 and 87 of connector wire 81 and the single connection 89 for connector wire 80. The operating member 69 of switch 68 carries a plurality of switch contacts 90 and 91 adapted always to remain in contact with the respective segmental contacts 92 and 93, respectively. Contacts 92 and 93 are respectively connected to shunt connections 78 and 79. Switch contacts 90 and 91 are adapted alternately to contact either with contacts 94 and 95, connected to branch connections 86 and 89, respectively, in one position of the switch, or else with contacts 95 and 96, connected with branch connections 89 and 87, respectively, in the other position of the switch, to thereby reverse the direction of flow of current through armature windings 82. I prefer to provide a plurality of stops 97 and 98 to limit the angle of oscillation of operating member 69.

The operation of the illustrative embodiment herein shown and described is as follows: On closing main switch 99, which may be suitably disposed, as in lead wire 77, current is supplied to motor 32 to thereby operate pulley 30 to drive belt 29 and its associated pulley 28. In this way pinion 25 is rotated and by engagement with sprocket wheel 24 actuates sprocket chain 22.

Assuming that the operation of the motor was started with carriage member 12 in its neutral or intermediate position, as shown in Fig. 3, and that the position of reversing switch 68 is such that the movement of the chain 22 will carry member 19, connection member 14, and associated carriage member 12 to the left, as shown in Figs. 3 and 4, this movement will continue at full, normal speed, and with full current supplied to the motor until one of the moving parts of the device, herein shown as member 19, is brought against one of the stops or projections on member 35, herein shown as stop 54.

The momentum or kinetic energy of the moving parts will be taken up by stop 54, member 35, to which stop 54 is attached, and the other parts of the device associated with member 35. This operation will act to expand springs 41 and 48 against their tendency to remain in normal position, and will act also to compress springs 40 and 49 against their tendency to remain in normal position. Member 35 and its associated springs will therefore act to store up the kinetic energy of the various moving parts of the machine to thereby efficiently but gently retard the velocity of such moving parts and to speedily bring them to a stop.

At or near the time when member 19 or its equivalent is brought into contact with stop 54, member 63 is brought to bear against operating member 69 of switch 68 to reverse the direction of flow of current through the motor to thereby reverse the direction of rotation of the armature of the same. At or near the same time, contacts 73 and 74 are separated to thereby no longer short-circuit resistance R, which is of suitable magnitude, depending on the size of the motor, etc., and putting such resistance in series with the armature windings 82, thus materially reducing the amount of current supplied to the motor.

It will thus be seen that not only is the direction of current flow reversed at or about the time when the velocity of the moving parts of the device commences to be reduced, but also such reverse current is considerably reduced in amount. In this way, I am enabled to fully utilize the energy of the moving parts to quickly and efficiently reduce the velocity of such parts to bring the machine to a stop and to store up the kinetic energy of said moving parts for assisting in starting such parts in their return or reverse movement.

After the springs have been stretched or compressed, as the case may be, to their maximum amount, and member 35 has been displaced from normal position to its maximum amount, dependent on the size and weight of the various parts, the reverse direction of current flow in the armature, co-operating with the springs, acts to bring the motor to a stop, and then acts in conjunction with such springs to efficiently start the moving parts in their reverse movement.

By the time the springs have given up their stored energy to the moving parts, member 35 will have reached its normal or neutral position to thereby bring contacts 73 and 74 once more into electrical engagement with each other to once more short-circuit resistance R and thereby restore to the motor the full normal supply of current. It will thus be seen that after the velocity of the moving parts has been accelerated to the proper point by means of the energy stored in the springs and by means of the small, reverse current flow temporarily supplied to the motor, the full current is then turned on and the moving parts are actuated at full normal speed. The same series of operations is repeated at the other end of the machine.

In this way it will be seen that I utilize the kinetic energy of the moving parts at both ends of the travel of such parts to bring such moving parts to a gentle but effective stop with a considerable economy of energy which is stored up to be later used as means to help start such parts in their reverse direction of travel.

It is of course to be understood that my invention is not to be limited to the particular embodiment herein shown and described by way of example merely. It is also to be understood that the invention may be applied with equal success to devices where an oscillatory motion is desired, and that throughout the specification and claims, except where inconsistent with such a meaning, I intend that the terms "reciprocatory," "reciprocatable," and "reciprocating" shall cover also such oscillatory motion.

What I claim is:

1. Motor control mechanism for a machine having a motor actuated reciprocating carriage, comprising a slidable contact carrier having a stop effectively positioned at each side and in the path of a reciprocating portion of the machine, a resistance element in the armature circuit of the motor, a short circuit for said resistance including a movable contact on the carrier normally engaging a fixed contact to close the short circuit, a reversing switch in the armature circuit, and means on the contact carrier for throwing the reversing switch when the short circuit is open.

2. Motor control mechanism for a machine having a motor actuated reciprocating carriage, comprising a slidable contact carrier, means movable with said carriage for engaging and longitudinally displacing said contact carrier, spring means for yieldingly resisting said displacement in both directions, a resistance element in the armature circuit of the motor, a short circuit for said resistance element including a movable contact on the carrier normally held in circuit closing engagement with a fixed contact by the aforesaid spring means, a reversing switch in the armature circuit, and means on the contact carrier for throwing the reversing switch when the short circuit is open.

In testimony whereof, I have signed my name to this specification this 11th day of May, 1918.

WILLIAM FELS.